United States Patent
Cho et al.

(10) Patent No.: US 9,213,203 B2
(45) Date of Patent: Dec. 15, 2015

(54) THREE-DIMENSIONAL IMAGE DISPLAY

(75) Inventors: JungHyun Cho, Suwon-si (KR); Taehyung Kim, Anyang-si (KR); Seong Mo Hwang, Seongnam-si (KR); Il Ho Lee, Hwaseong-si (KR); Jae Jin Pyun, Hwaseong-si (KR); Yoon Gu Kim, Seongnam-si (KR); Hyeon Yong Jang, Hwaseong-si (KR); Sang Min Jeon, Yongin-si (KR); Moon Jung Baek, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 217 days.

(21) Appl. No.: 13/527,205

(22) Filed: Jun. 19, 2012

(65) Prior Publication Data
US 2013/0208195 A1    Aug. 15, 2013

(30) Foreign Application Priority Data
Feb. 9, 2012  (KR) .................. 10-2012-0013425

(51) Int. Cl.
G02F 1/1335    (2006.01)
G02F 1/1343    (2006.01)
G02F 1/1347    (2006.01)
G02B 27/22     (2006.01)
H04N 13/04     (2006.01)

(52) U.S. Cl.
CPC ...... *G02F 1/134309* (2013.01); *G02B 27/2214* (2013.01); *G02F 1/1347* (2013.01); *H04N 13/0413* (2013.01); *H04N 13/0454* (2013.01)

(58) Field of Classification Search
CPC .............. G02F 1/1335; G02B 27/2214; G02B 27/2264
USPC ............................................ 349/15, 144–146
See application file for complete search history.

(56) References Cited

U.S. PATENT DOCUMENTS

| | | | |
|---|---|---|---|
| 5,969,850 A | 10/1999 | Harrold et al. | |
| 7,710,648 B2 | 5/2010 | Chestak et al. | |
| 2007/0081208 A1 | 4/2007 | Chang et al. | |
| 2007/0120973 A1 | 5/2007 | Kim et al. | |
| 2008/0211976 A1* | 9/2008 | Nam et al. | 349/15 |
| 2010/0220177 A1 | 9/2010 | Park | |
| 2010/0271346 A1* | 10/2010 | Ku et al. | 345/204 |
| 2011/0043715 A1* | 2/2011 | Ohyama et al. | 349/15 |
| 2011/0228185 A1* | 9/2011 | Hamagishi | 349/15 |

FOREIGN PATENT DOCUMENTS

| | | |
|---|---|---|
| JP | 4727392 | 4/2011 |
| KR | 10-0739067 | 7/2007 |

(Continued)

*Primary Examiner* — Nathanael R Briggs
(74) *Attorney, Agent, or Firm* — H.C. Park & Associates, PLC

(57) ABSTRACT

A 3D image display includes a display panel operated in 2D and 3D driving modes and a barrier panel turned off in the 2D driving mode and turned on in the 3D driving mode to separate an image output from the display panel to left and right-eye images. The barrier panel includes a reference electrode, first barrier electrodes arranged in a first direction, second barrier electrodes alternately arranged with the first barrier electrodes along the first direction, and a liquid crystal layer interposed between the reference electrode and the first and second barrier electrodes. Each first barrier electrode includes first electrode pieces arranged in a zigzag fashion along a second direction different from the first direction, and each second barrier electrode includes second electrode pieces arranged in the zigzag fashion.

28 Claims, 17 Drawing Sheets

(56) References Cited

FOREIGN PATENT DOCUMENTS

| KR | 10-2009-0058428 | 6/2009 |
| KR | 10-2010-0008146 | 1/2010 |
| KR | 10-1002660 | 12/2010 |
| KR | 10-1068323 | 9/2011 |
| KR | 10-1113066 | 2/2012 |

* cited by examiner 3D driving mode - odd frame

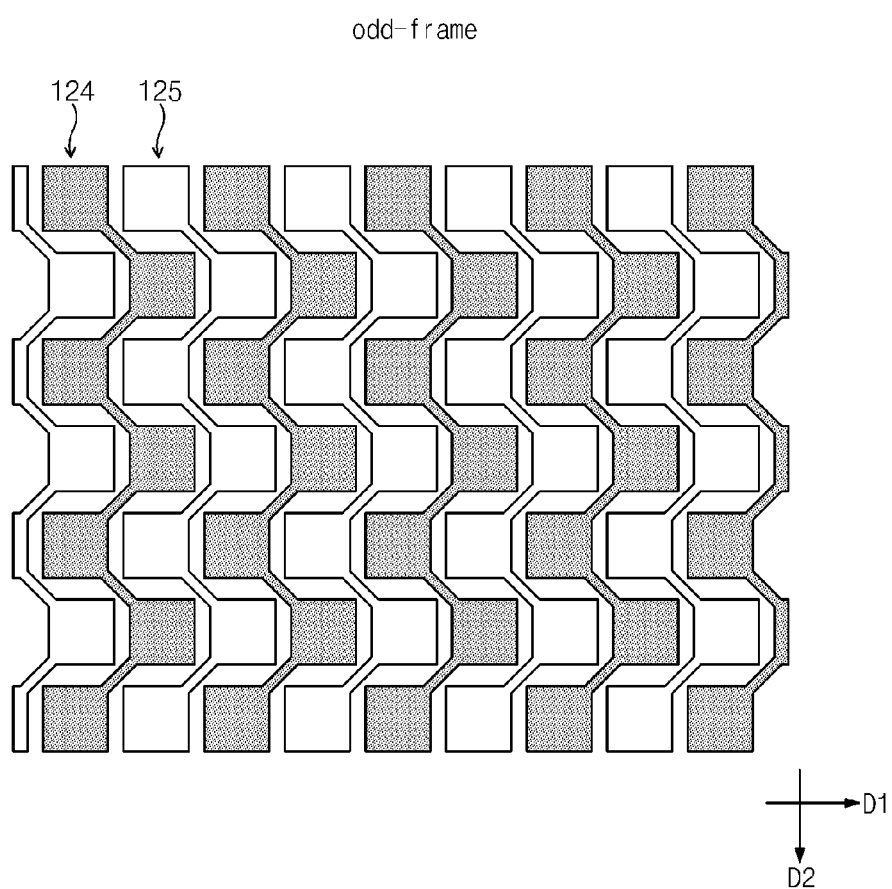

THREE-DIMENSIONAL IMAGE DISPLAY

CROSS-REFERENCE TO RELATED APPLICATION

This application claims priority from and the benefit of Korean Patent Application No. 10-2012-0013425, filed on Feb. 9, 2012, which is hereby incorporated by reference for all purposes as if fully set forth herein.

BACKGROUND

1. Field

The present disclosure relates to a three-dimensional (3D) image display capable of displaying a 3D image as well as a two-dimensional (2D) image.

2. Discussion of the Background

In general, a 3D image display provides left-eye images and right-eye images, which have a binocular disparity, to the left eye and the right eye of a viewer, respectively. To this end, a lenticular lens or a parallax barrier may be disposed at a position spaced apart from a display panel that displays a 2D image, and thus the viewer perceives different images through the left and right eyes thereof.

In a 3D image display having the lenticular lens, the left and right-eye images are disposed at a focal plane of the lenticular lens, which has a striped, semi-cylindrical shape, and the left and right-eye images are separated from each other by the lenticular lens. Accordingly, the viewer may perceive the 3D image without wearing glasses.

The 3D image display apparatus having a parallax barrier has slits arranged in the form of stripes at regular intervals to transmit or block light, and alternately arranges the left and right images in the front or rear of the slits. Thus, when the viewer views the images passing through the parallax barrier from a specific timing point, the left and right-eye images are geometrical-optically separated from each other, so the viewer perceives the images as 3D images.

The above information disclosed in this Background section is only for enhancement of understanding of the background of the invention and therefore it may contain information that does not form any part of the prior art nor what the prior art may suggest to a person of ordinary skill in the art.

SUMMARY

The present disclosure provides a 3D image display capable of driving a parallax barrier panel in the same manner regardless of the vertical or horizontal orientation of the parallax barrier panel.

Additional features of the invention will be set forth in the description which follows, and in part will be apparent from the description, or may be learned by practice of the invention.

Embodiments of the inventive concept provide a 3D image display that includes a display panel and a barrier panel. The display panel displays a first image in a 2D driving mode and displays second and third images during respective first and second periods alternately generated in a 3D driving mode. The barrier panel transmits the first image during the 2D driving mode, forms a first barrier pattern during the first period to separate the second image into left and right-eye images, and forms a second barrier pattern during the second period to separate the third image into the left and right-eye images.

The barrier panel includes a reference electrode, a plurality of first barrier electrodes, a plurality of second barrier electrodes, and a liquid crystal layer. The first barrier electrodes face the reference electrode and are arranged in a first direction, and each first barrier electrode includes a plurality of first electrode pieces arranged in a zigzag fashion along a second direction different from the first direction. The second barrier electrodes face the reference electrode and are alternately arranged with the first barrier electrodes in the first direction, and each second barrier electrode includes a plurality of second electrode pieces arranged in the zigzag fashion along the second direction. The liquid crystal layer is interposed between the reference electrode and the first barrier electrodes and between the reference electrode and the second barrier electrodes.

Embodiments of the inventive concept also provide a barrier panel configured to transmit a two dimensional (2D) image in a 2D image display mode, and to transmit a three dimensional (3D) image in a 3D image display mode by forming a first barrier pattern during a first period to provide left and right-eye images and by forming a second barrier pattern during a second period different from the first period to provide left and right-eye images. The barrier panel includes a first substrate including a reference electrode, a second substrate including a plurality of first barrier electrodes and a plurality of second barrier electrodes facing the reference electrode and being alternately arranged with each other along a first direction, and a liquid crystal layer disposed between the first substrate and the second substrate. Each first barrier electrode includes a plurality of electrically connected first electrode pieces arranged in a zigzag fashion along a second direction different from the first direction, and each second barrier electrode includes a plurality of electrically connected second electrode pieces arranged in the zigzag fashion along the second direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7A and FIG. 7B are views showing an operation of a parallax barrier panel that is arranged in a horizontal orientation.

DETAILED DESCRIPTION

Figure 1:
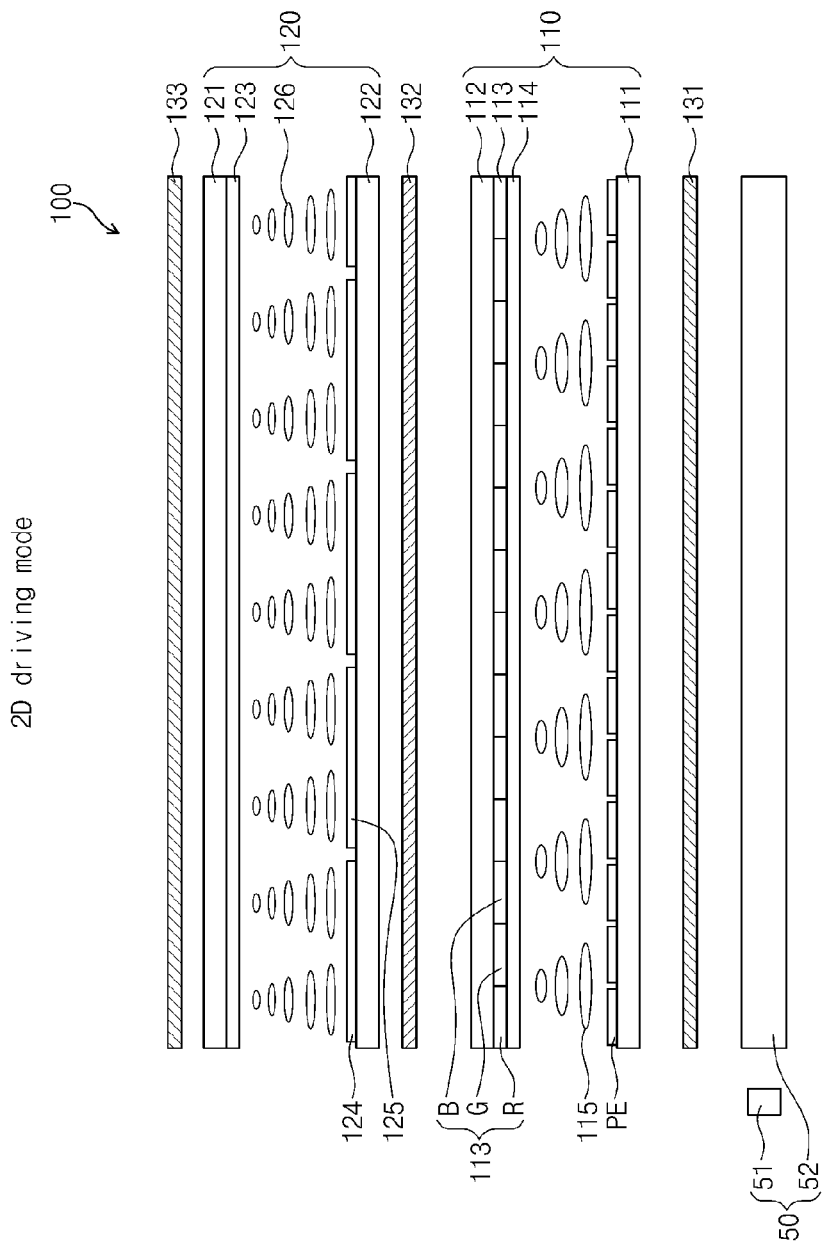
FIG. 1 is a cross-sectional view showing a 3D image display according to an exemplary embodiment of the present invention.

Exemplary embodiments of the present invention are described more fully hereinafter with reference to the accompanying drawings. This invention may, however, be embodied in many different forms and should not be construed as limited to the embodiments set forth herein, which are merely exemplary (i.e., examples). Rather, these exemplary embodiments are provided so that this disclosure is thorough, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a cross-sectional view showing a 3D image display according to an exemplary embodiment of the present invention. FIG. 1 shows a 3D image display operated in a 2D mode.

Referring to FIG. 1, a 3D image display 100 includes a backlight unit 50 that generates light, a display panel 110 that displays an image using the light, and a parallax barrier panel 120 disposed on the display panel 110.

The backlight unit 50 includes a light source 51 that emits light and a light guide plate 52 that guides the light incident thereto to the display panel 110. As an example, the light source 51 may include at least one light emitting diode and may be disposed adjacent to at least one side surface of the light guide plate 52.

Although the backlight unit 50 shown in FIG. 1 is an edge type backlight unit in which the light source 51 is disposed adjacent to the side surface of the light guide plate 52, the 3D image display 100 can include any type of light emitting unit that can provide light to display panel 110 to display an image. For example, the backlight unit 50 may be a direct illumination type backlight unit in which the light source 51 is disposed right under a diffusion plate (not shown), and the light source 51 may be configured to include a fluorescent lamp rather than the light emitting diode.

The display panel 110 includes a first base substrate 111, a second base substrate 112 facing the first base substrate 111, and a first liquid crystal layer 115 interposed between the first base substrate 111 and the second base substrate 112. The first base substrate 111 includes a plurality of pixel electrodes PE arranged in a matrix form. Although not shown in FIG. 1, the first base substrate 111 may further include gate lines extending in a row direction, data lines extending in a column direction, and thin film transistors connected to the pixel electrodes PE in a one-to-one correspondence.

The second base substrate 112 includes a color filter layer 113 and a common electrode 114 disposed thereon. The color filter layer 113 may include red, green, and blue color pixels R, G, and B, and each color pixel R, G, and B may be disposed corresponding to each pixel electrode of the pixel electrodes PE. The common electrode 114 is disposed on the color filter layer 113 to form a vertical electric field with the pixel electrodes PE.

The first liquid crystal layer 115 includes a plurality of liquid crystal molecules, and an alignment direction of the liquid crystal molecules is controlled by the vertical electric field. Accordingly, the display panel 110 controls a transmittance of the light from the backlight unit 50 so as to display an image.

In FIG. 1, a liquid crystal display panel has been shown as the display panel 110. However, the display panel 110 may be any suitable type of display panel. For example, the display panel 110 may be an organic light emitting display panel that includes an organic light emitting device. In this case, the backlight unit 50 may be removed from the 3D image display 100. Moreover, the display panel 110 may have various alternative configurations because it may be implemented with any suitable liquid crystal display panel. As one example of many, the pixel electrodes PE and the common electrode 114 may be disposed on the same substrate.

As shown in FIG. 1, the pixel electrodes PE correspond to the color pixels R, G, and B in a one-to-one correspondence. In the present exemplary embodiment, pixels respectively corresponding to the red, green, and blue color pixels R, G, and B are referred to as sub-pixels, and three sub-pixels respectively corresponding to the red, green, and blue color pixels R, G, and B are referred to as one pixel.

The parallax barrier panel 120 includes a first substrate 121, a second substrate 122 facing the first substrate 121, and a second liquid crystal layer 126 interposed between the first substrate 121 and the second substrate 122. A reference electrode 123 is disposed on the first substrate 121, and a plurality of first barrier electrodes 124 and a plurality of second barrier electrode 125 are disposed on the second substrate 122. The reference electrode 123 may be a single-body electrode formed over an entire light-emitting portion of the first substrate 121.

The first barrier electrodes 124 face the reference electrode 123 to be aligned in a predetermined direction, and the second barrier electrodes 125 are alternately arranged with the first barrier electrodes 124 along the predetermined direction.

The first and second barrier electrodes 124 and 125 will be described in detail with reference to FIG. 6A and FIG. 6B.

The second liquid crystal layer 126 may include a twisted nematic liquid crystal. In addition, the liquid crystal may be a normally white liquid crystal. In this case, the parallax barrier panel 120 is turned off in the 2D driving mode during which the 2D image is displayed. Thus, the display panel 110 transmits the light provided from the backlight unit 50 to output the light for the 2D image. Accordingly, the parallax barrier panel 120 receives the light for the 2D image from the display panel 110 and displays the 2D image.

In the 3D driving mode, the parallax barrier panel 120 is turned on to display the 3D image. The 3D driving mode will be described in detail with reference to FIGS. 2 to 5.

The 3D image display 100 further includes a first polarizer 131 disposed between the display panel 110 and the backlight unit 50, a second polarizer 132 disposed between the display panel 110 and the parallax barrier panel 120, and a third polarizer 133 disposed on the parallax barrier panel 120.

The first polarizer 131 may have a first absorbing axis that is substantially parallel to one of two diagonal lines of the display panel 110. Since the first liquid crystal layer 115 includes the twisted nematic liquid crystal, the second polarizer 132 may have a second absorbing axis that is substantially perpendicular to the first absorbing axis of the first polarizer 131. In addition, since the second liquid crystal layer 126 of the parallax barrier panel 120 includes the twisted nematic liquid crystal, the third polarizer 133 may have a third absorbing axis that is substantially perpendicular to the second absorbing axis of the second polarizer 132.

The first and second polarizers 131 and 132 may be respectively attached to a lower surface and an upper surface of the display panel 110, and the third polarizer 133 may be attached to an upper surface of the parallax barrier panel 120.

The 3D image display 100 may further include an adhesive film (not shown) interposed between the second polarizer 132 and the parallax barrier panel 120 to couple the parallax barrier panel 120 and the display panel 110 together.

Figure 2:
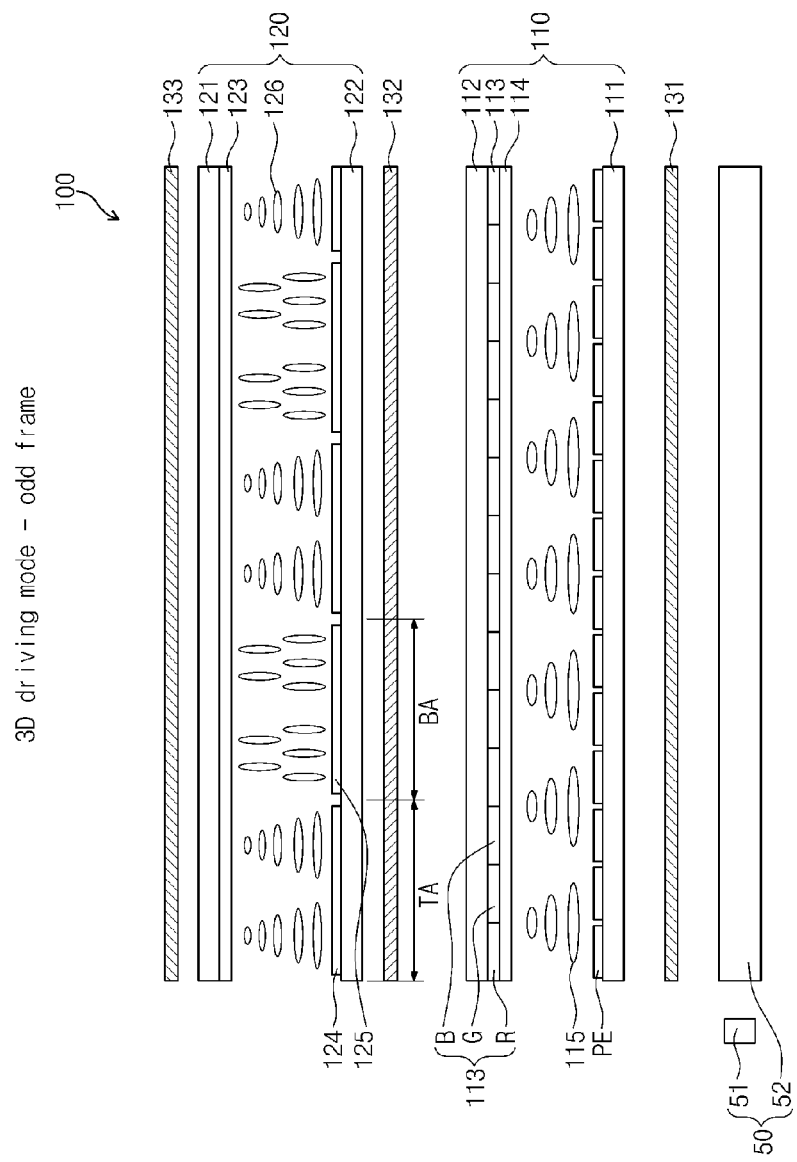
FIG. 2 is a cross-sectional view showing odd frames of a 3D driving mode of the 3D image display shown in FIG. 1.
Figure 3:
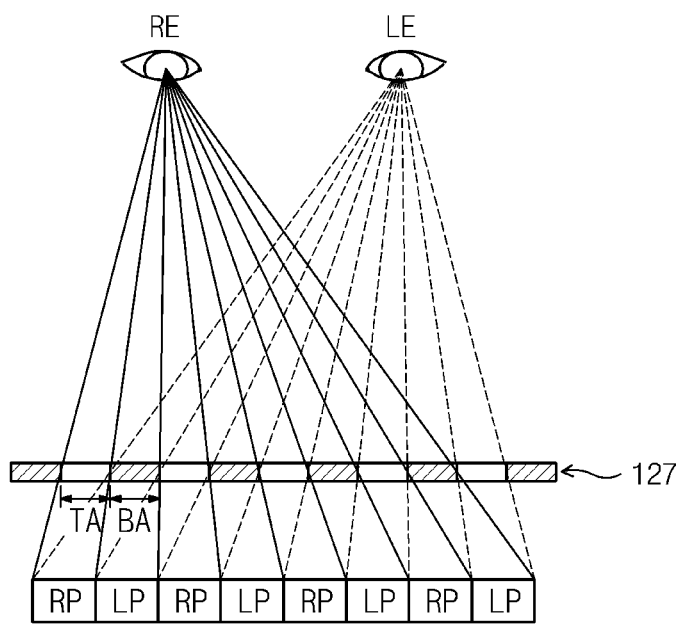
FIG. 3 is a view showing a process that allows a viewer to perceive a 3D image in odd frames.

FIG. 2 is a cross-sectional view showing an odd frame3D driving mode of the 3D image display shown in FIG. 1, and FIG. 3 is a view showing a process that allows a viewer to perceive a 3D image in odd frames.

In the 3D driving mode, the 3D image display may be operated in different modes depending on the odd frame and the even frame. When one frame period is defined as 1F in the 2D driving mode, in the 3D driving mode, the odd frame may correspond to an earlier ½ period (e.g., earlier half frame) of the 1F, and the even frame may correspond to a later ½ period (e.g., later half frame) of the 1F. Accordingly, a driving frequency of the 3D image display 100 in the 3D driving mode may be twice that of the driving frequency of the 3D image display 100 in the 2D driving mode.

Referring to FIG. 2 and FIG. 3, in the 3D driving mode, the display panel 110 is divided into a left-eye pixel part LP, which displays the left-eye images, and a right-eye pixel part RP, which displays the right-eye images. Each of the left-eye pixel part LP and the right-eye pixel part RP may include three sub-pixels. In addition, the left-eye pixel part LP and the right-eye pixel part RP may be alternately arranged in a row direction and a column direction.

The positions of the left-eye pixel part LP and the right-eye pixel part RP may be exchanged with each other every half frame. That is, the left-eye pixel part LP of the odd frame is exchanged with the right-eye pixel part RP in the even frame, and the right-eye pixel part RP of the odd frame is exchanged with the left-eye pixel part LP.

When the reference electrode 123, which is disposed on the parallax barrier panel 120, receives a predetermined reference voltage during the odd frame, the first barrier electrodes 124 receive a first driving voltage and the second barrier electrodes 125 receive a second driving voltage that differs from the first driving voltage. When the second liquid crystal layer 126 includes the normally white liquid crystal, the first driving voltage may have the same level as the reference voltage, and the second driving voltage may have a different level from the reference voltage. Thus, during the odd frame, the first barrier electrodes 124 form light transmission areas TA, and the second barrier electrodes 125 form light blocking areas BA.

In detail, since the electric field is not formed between the reference electrode 123 and the first barrier electrodes 124, areas in which the first barrier electrodes 124 are formed are defined as the light transmission areas TA. Since the vertical electric field is formed between the reference electrode 123 and the second barrier electrodes 125, areas in which the second barrier electrodes 125 are formed are defined as the light blocking areas BA.

In the present exemplary embodiment, light transmission/blocking patterns formed by the first and second barrier electrodes 124 and 125 during the odd frame are referred to as a first barrier pattern 127.

In FIG. 2, the second liquid crystal layer 126 including the normally white liquid crystal has been shown as a representative example. However, if the second liquid crystal layer 126 includes a normally black liquid crystal, the first driving voltage may have the different level from the reference voltage, and the second driving voltage may have the same level as the reference voltage. Hereinafter, for the convenience of explanation, the normally white mode liquid crystal will be described.

As shown in FIG. 3, the left and right-eye images respectively output from the left and right-eye pixel parts LP and RP of the display panel 110 are provided to the left eye LE and the right eye RE of the viewer after passing through the light transmission pattern TA. Here, the light blocking pattern BA blocks the left-eye images output from the left-eye pixel part LP of the display panel 110 from being provided to the right eye RE of the viewer and blocks the right-eye images output from the right-eye pixel part RP of the display panel 110 from being provided to the left eye LE of the viewer.

Consequently, the left eye LE of the viewer perceives the left-eye images and the right eye RE of the viewer perceives the right-eye images via the first barrier pattern 127 formed in the parallax barrier panel 120. Accordingly, the viewer may perceive the image displayed on the display panel 110 as 3D images by using binocular disparity of the images respectively provided to the left eye LE and the right eye RE.

Figure 4:
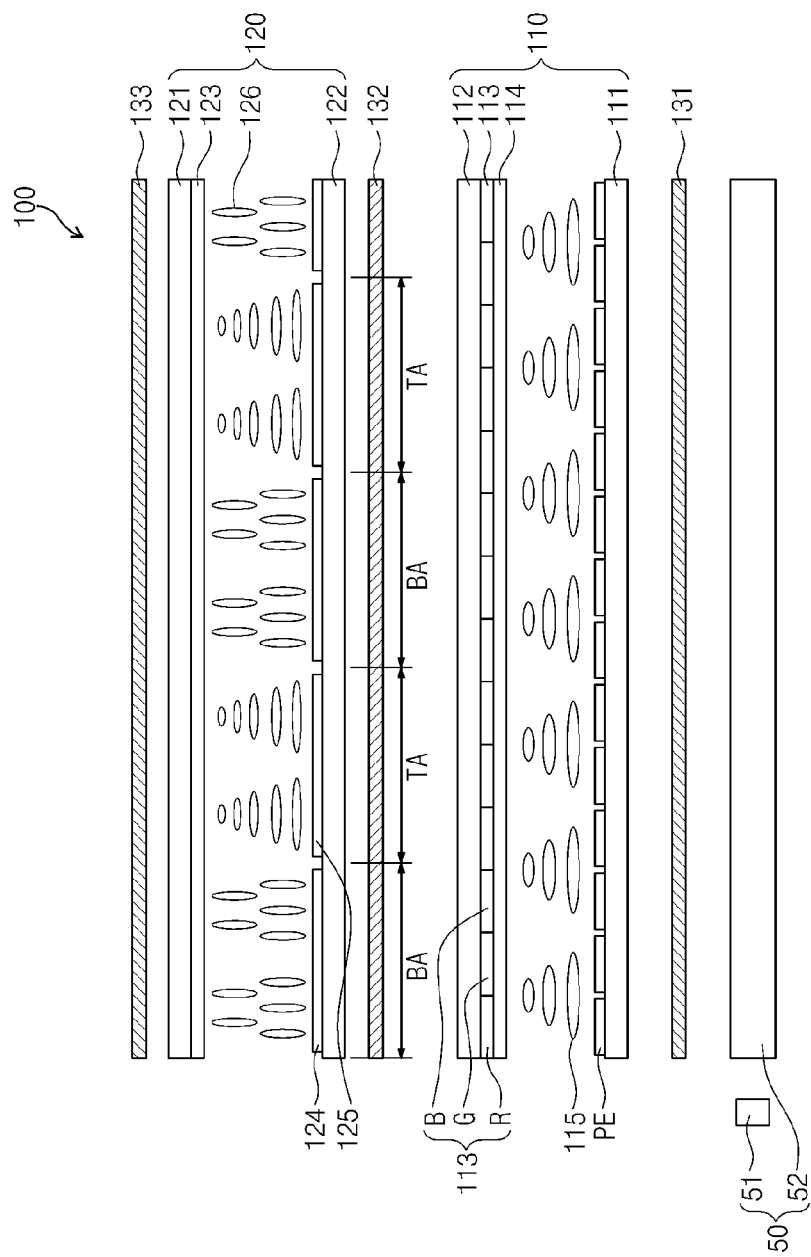
FIG. 4 is a cross-sectional view showing even frames of a 3D driving mode of the 3D image display shown in FIG. 1.
Figure 5:
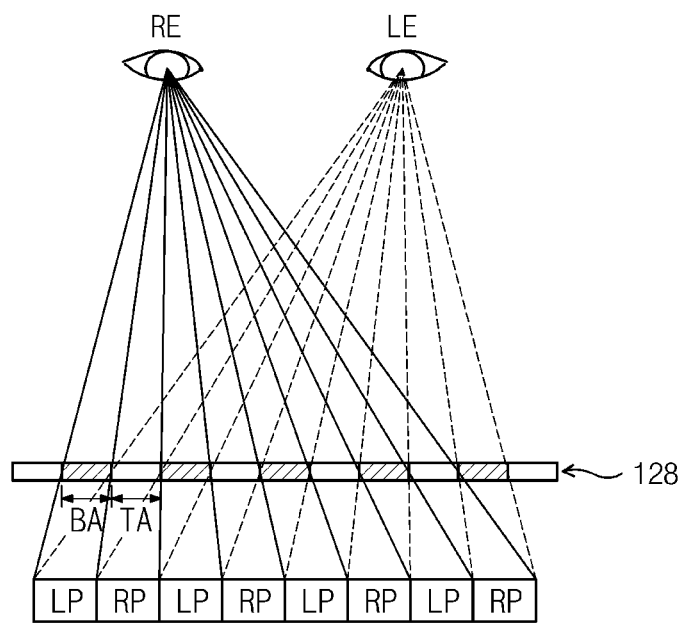
FIG. 5 is a view showing a process that allows a viewer to perceive a 3D image in even frames.

FIG. 4 is a cross-sectional view showing an even frame 3D driving mode of the 3D image display shown in FIG. 1, and FIG. 5 is a view showing a process that allows a viewer to perceive 3D images in even frames.

Referring to FIG. 4 and FIG. 5, the first barrier electrodes 124 form the light blocking areas BA and the second barrier electrodes 125 form the light transmission areas TA during the even frame.

That is, when the reference electrode 123 disposed on the parallax barrier panel 120 receives the predetermined reference voltage during the even frame, the first barrier electrodes 124 receive the second driving voltage and the second barrier electrodes 125 receive the first driving voltage. When the second liquid crystal layer 126 includes the normally white liquid crystal, the first driving voltage may have the same level as the reference voltage, and the second driving voltage may have a different level from the reference voltage.

Accordingly, since the vertical electric field is formed between the reference electrode 123 and the first barrier electrodes 124, the areas in which the first barrier electrodes 124 are formed are defined as the light blocking areas BA. Since the electric field is not formed between the reference electrode 123 and the second barrier electrodes 125, the areas in which the second barrier electrodes 125 are formed are defined as the light transmission areas TA.

In the present exemplary embodiment, light transmission/blocking patterns formed by the first and second barrier electrodes 124 and 125 during the even frame are referred to as a second barrier pattern 128.

As shown in FIG. 5, the left and right-eye images respectively output from the left and right-eye pixel parts LP and RP of the display panel 110 are provided to the left eye LE and the right eye RE of the viewer after passing through the light transmission pattern TA. Here, the light blocking pattern BA blocks the left-eye images output from the left-eye pixel part LP of the display panel 110 from being provided to the right eye RE of the viewer and blocks the right-eye images output from the right-eye pixel part RP of the display panel 110 from being provided to the left eye LE of the viewer.

The left eye LE of the viewer perceives the left-eye images and the right eye RE of the viewer perceives the right-eye images via the second barrier pattern 128 formed in the parallax barrier panel 120. Accordingly, the viewer may perceive the images displayed on the display panel 110 as 3D images by using the binocular disparity of the images respectively provided to the left eye LE and the right eye RE.

Figure 6A:
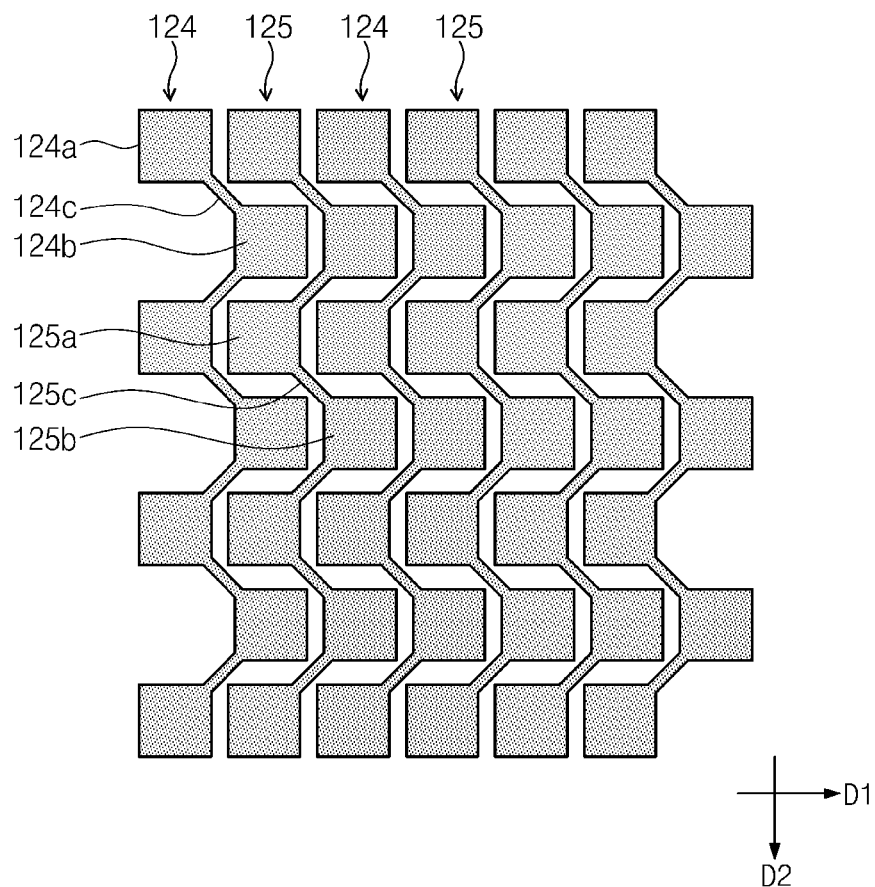
FIG. 6A is a plan view showing a first barrier electrode and a second barrier electrode shown in FIG. 2.
Figure 6B:
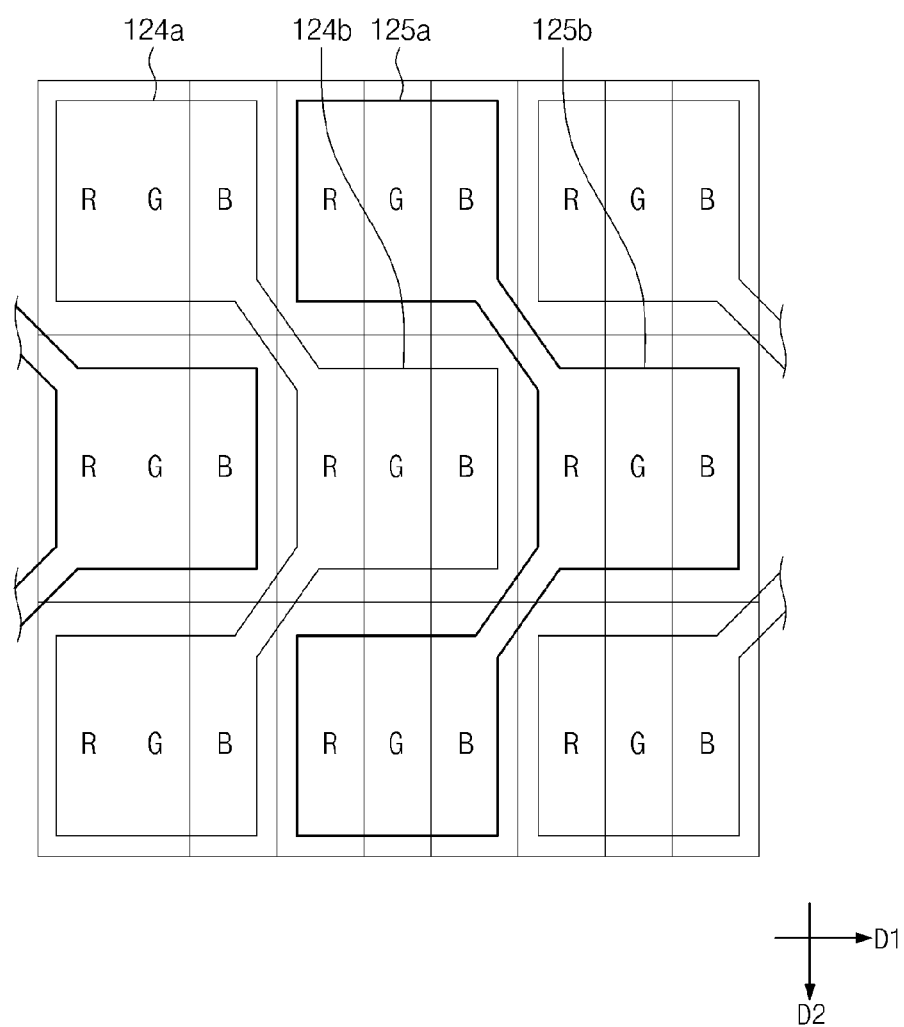
FIG. 6B is a plan view showing a relation between a pixel and first and second electrode pieces.

FIG. 6A is a plan view showing a first barrier electrode and a second barrier electrode shown in FIG. 2, and FIG. 6B is a plan view showing a relation between a pixel and first and second electrode pieces.

Referring to FIG. 6A, the first barrier electrodes 124 and the second barrier electrodes 125 are alternately arranged in the first direction D1.

Each first barrier electrode 124 includes a plurality of first electrode pieces 124a and 124b arranged in a zigzag fashion along a second direction D2 different from the first direction D1. In detail, the first electrode pieces 124a positioned at odd-numbered rows are positioned at odd-numbered columns, and the first electrode pieces 124b positioned at even-numbered rows are positioned at even-numbered columns.

Each second barrier electrode 125 includes a plurality of second electrode pieces 125a and 125b arranged in a zigzag fashion along the second direction D2. In detail, the second electrode pieces 125a positioned at odd-numbered rows are positioned at even-numbered columns, and the second electrode pieces 125b positioned at even-numbered rows are positioned at odd-numbered columns. Thus, the first electrode pieces 124a and 124b may be alternately arranged with the second electrode pieces 125a and 125b in the first and second directions D1 and D2.

In addition, each first barrier electrode 124 further includes a first connection electrode 124c to electrically connect two adjacent first electrode pieces 124a and 124b to each other. The first connection electrode 124c may be integrally formed with the two first electrode pieces 124a and 124b. Each second barrier electrode 125 further includes a second connection electrode 125c to electrically connect two adjacent second electrode pieces 125a and 125b to each other. The second connection electrode 125c may be integrally formed with the two second electrode pieces 125a and 125b.

As shown in FIG. 6B, each first electrode piece 124a and 124b may have a size corresponding to a size of one pixel and may be disposed corresponding to the one pixel. Each pixel includes three sub-pixels, which may correspond to the red, green, and blue color pixels R, G, and B, respectively. In addition, each sub-pixel has a width in the first direction D1, which may correspond to one-third of a width thereof in the second direction D2, and the three sub-pixels are arranged in the first direction D1. Accordingly, each pixel may have a square shape with the same width in the first and second directions D1 and D2.

As described above, each first electrode piece 124a and 124b may have the square shape with the same length in the first and second directions D1 and D2. Although not shown, each first electrode piece 124a and 124b may alternatively have a size corresponding to more than a size of one pixel.

The second electrode pieces 125a and 125b respectively correspond to the pixels at different positions from those of the first electrode pieces 124a and 124b. Although not shown, each second electrode piece 125a and 125b may alternatively have a size corresponding to more than a size of one pixel.

As described, the 3D image display 100 may be used for a system with a pivot function. In detail, the viewer that utilizes the system with the pivot function may arrange the 3D image display 110 in a horizontal orientation or a vertical orientation. The operation of the parallax barrier panel 120 in each of the horizontal and vertical orientations will be described below.

Figure 7B:
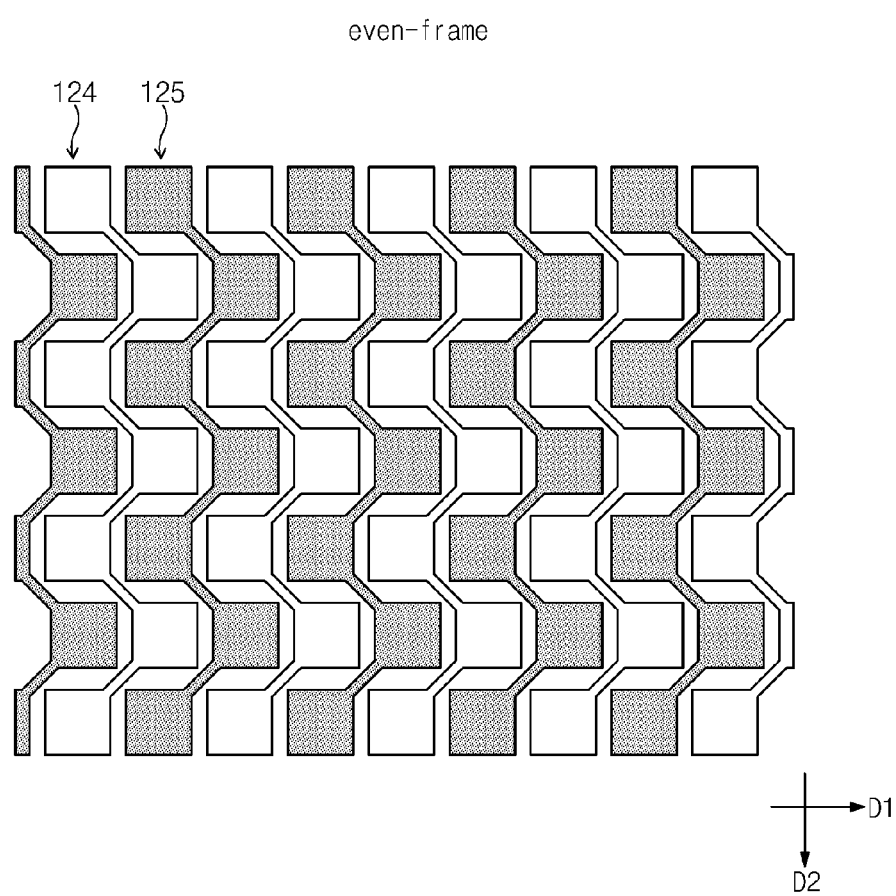

FIG. 7A and FIG. 7B are views showing the operation of the parallax barrier panel while arranged in the horizontal orientation. Particularly, FIG. 7A shows the operation of the parallax barrier panel 120 in the odd frame period of the 3D driving mode, and FIG. 7B shows the operation of the parallax barrier panel 120 in the even frame period of the 3D driving mode.

Referring to FIG. 7A, in the odd frame period of the 3D driving mode, the areas in which the first barrier electrodes 124 are formed are defined as the barrier areas to block the light, and the areas in which the second barrier electrodes 125 are formed are defined as the transmission areas to transmit the light. For the convenience of explanation, the barrier areas are shown in gray in FIGS. 7A and 7B, and the transmission areas are shown in white in FIGS. 7A and 7B.

Each first barrier electrode 124 includes the first electrode pieces 124a and 124b, and each second barrier electrode 125 includes the second electrode pieces 125a and 125b. In addition, the first electrode pieces 124a and 124b are alternately arranged with the second electrode pieces 125a and 125b in the first and second directions D1 and D2. Accordingly, the barrier areas are arranged in a mosaic-shape on the parallax barrier panel 120.

Referring to FIG. 7B, in the even frame period of the 3D driving mode, the areas in which the first barrier electrodes 124 are formed are defined as the transmission areas to transmit the light, and the areas in which the second barrier electrodes 125 are formed are defined as the barrier areas to block the light. Accordingly, in FIG. 7B, the barrier areas are arranged in the mosaic-shape on the parallax barrier panel 120 during the even frame period, but the gray color of FIG. 7A is changed to the white color and the white color of FIG. 7A is changed to the gray color.

Alternatively, the viewer may arrange the system in a vertical orientation by rotating the 3D image display 100 by about 90 degrees.

Figure 8A:
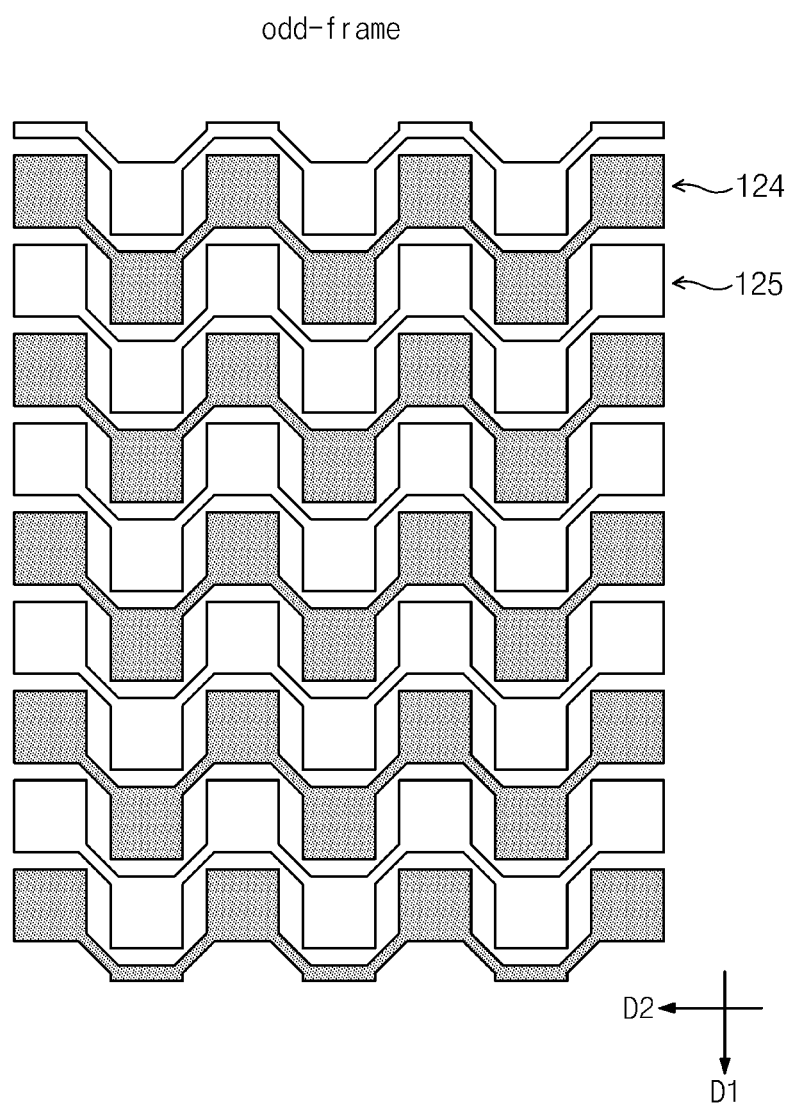
FIG. 8A and FIG. 8B are views showing an operation of a parallax barrier panel that is arranged in a vertical orientation.
Figure 8B:
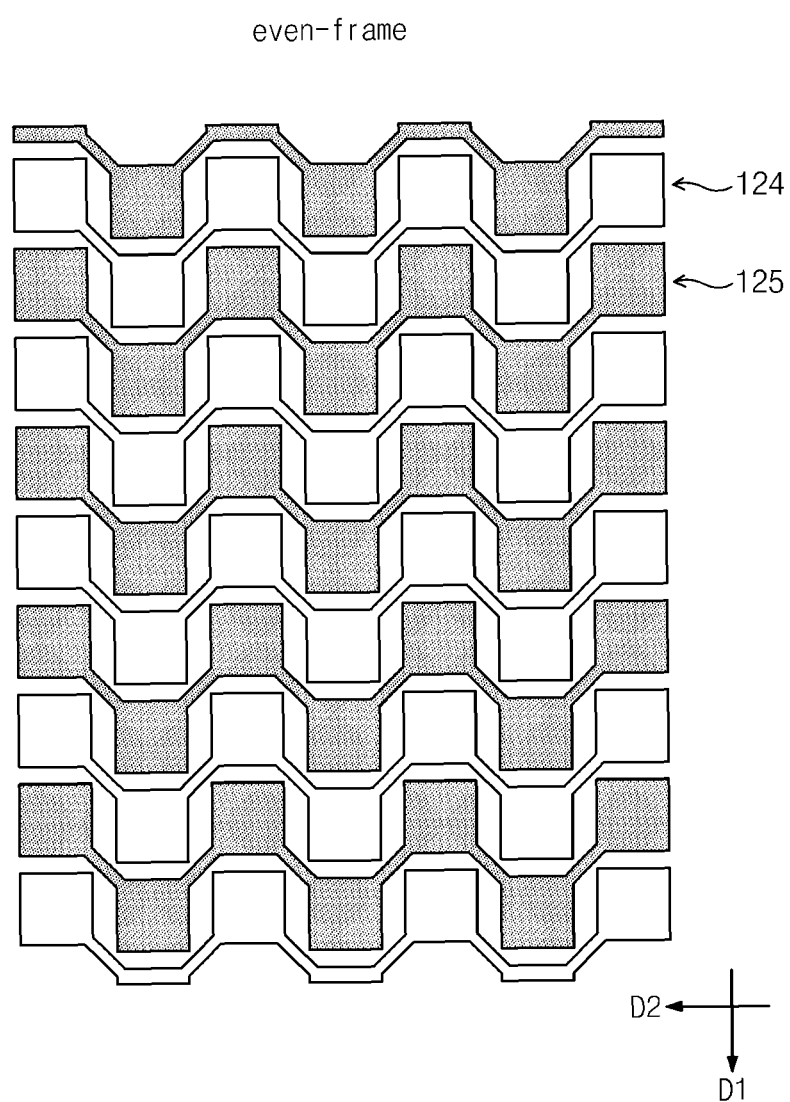

FIG. 8A and FIG. 8B are views showing the operation of the parallax barrier panel in the vertical orientation. Particularly, FIG. 8A shows the operation of the parallax barrier panel 120 in the odd frame period of the 3D driving mode, and FIG. 8B shows the operation of the parallax barrier panel 120 in the even frame period of the 3D driving mode.

Referring to FIG. 8A, in the odd frame period of the 3D driving mode, the areas in which the first barrier electrodes 124 are formed are defined as the barrier areas to block the light, and the areas in which the second barrier electrodes 125 are formed are defined as the transmission areas to transmit the light.

In addition, referring to FIG. 8B, in the even frame period of the 3D driving mode, the areas in which the first barrier electrodes 124 are formed are defined as the transmission areas to transmit the light, and the areas in which the second barrier electrodes 125 are formed are defined as the barrier areas to block the light.

That is, the mosaic pattern formed by the barrier areas with the display in a horizontal orientation is equal to the mosaic pattern formed by the barrier areas with the display in a vertical orientation except that the 3D image display 100 is rotated by about 90 degrees.

Thus, the parallax barrier panel 120 may be operated in the same manner regardless of its vertical or horizontal orientation. As a result, an additional process for controlling the operation of the parallax barrier panel 120 according to display orientation is unnecessary.

Figure 9A:
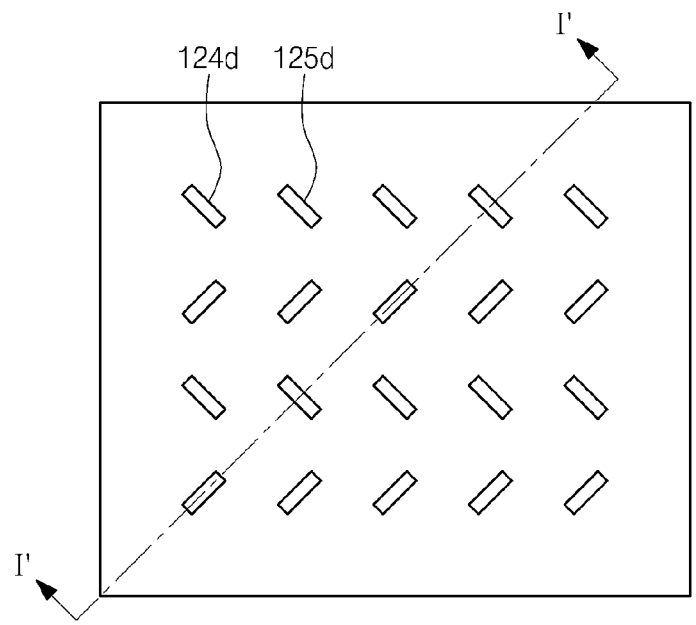
FIG. 9A and FIG. 9B are plan views showing first and second barrier electrodes according to an exemplary embodiment of the present invention.
Figure 9B:
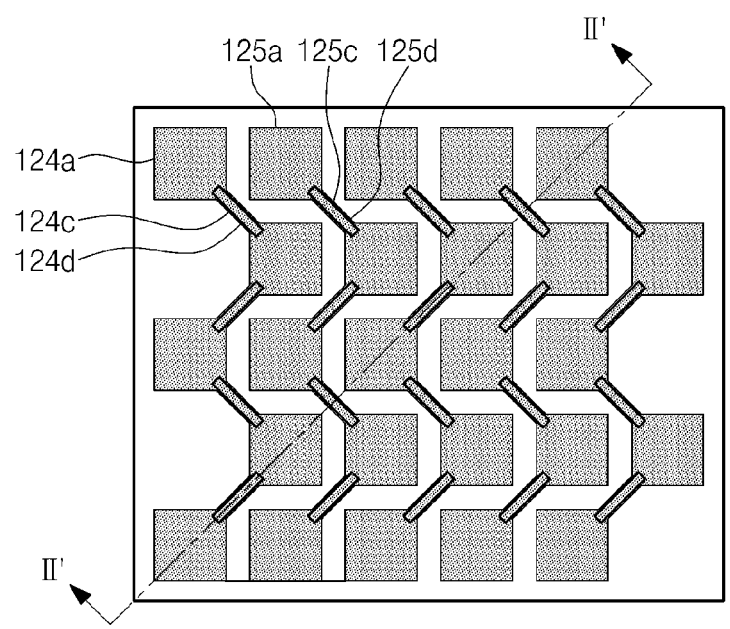
Figure 10A:
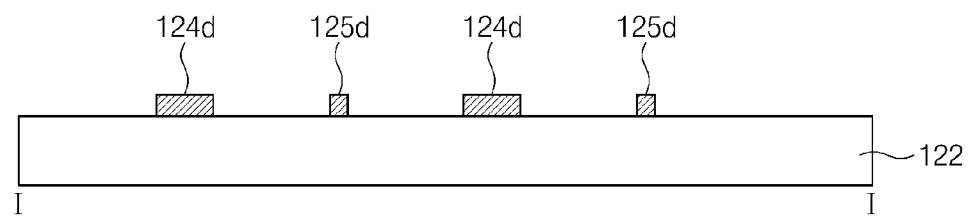
FIG. 10A is a cross-sectional view taken along line I-I' shown in FIG. 9A.
Figure 10B:
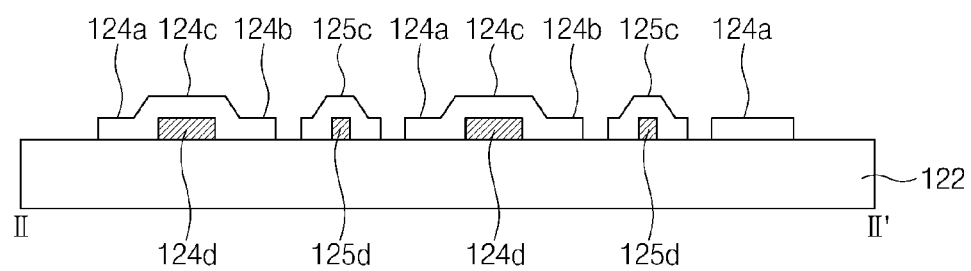
FIG. 10B is a cross-sectional view taken along line II-Ii' shown in FIG. 9B.

FIG. 9A and FIG. 9B are plan views showing first and second barrier electrodes according to an exemplary embodiment of the present invention, FIG. 10A is a cross-sectional view taken along line I-I' shown in FIG. 9A, and FIG. 10B is a cross-sectional view taken along line II-Ii' shown in FIG. 9B.

Referring to FIG. 9A and FIG. 10A, a first auxiliary connection electrode 124d and a second auxiliary connection electrode 125d may be further disposed on the second substrate 122 of the parallax barrier panel 120.

The first and second auxiliary connection electrodes 124d and 125d may be formed of a conductive material, such as a metallic material. The conductive material may range from transparent to opaque.

Referring to FIG. 9B and FIG. 10B, the first electrode pieces 124a and 124b and the second electrode pieces 125a and 125b are disposed on the second substrate 122. Two adjacent first electrode pieces 124a and 124b are electrically connected to each other by the first connection electrode 124c. The first connection electrode 124c may be disposed on the first auxiliary connection electrode 124d to make contact with the first auxiliary connection electrode 124d. Although not shown, the first auxiliary connection electrode 124d may alternatively be disposed on the first connection electrode 124c.

The first electrode pieces 124a and 124b and the first connection electrode 124c may include a transparent conductive material, e.g., indium tin oxide.

In addition, two adjacent second electrode pieces 125a and 125b are electrically connected to each other by the second connection electrode 125c. The second connection electrode 125c may be disposed on the second auxiliary connection electrode 125d to make contact with the second auxiliary connection electrode 125d. Although not shown, the second auxiliary connection electrode 125d may alternatively be disposed on the second connection electrode 125c.

The second electrode pieces 125a and 125b and the second connection electrode 125c may include a transparent conductive material, e.g., indium tin oxide.

As described above, since the first connection electrode 124c has a relatively smaller width than that of the first electrode pieces 124a and 124b, a resistance of the first barrier electrodes 124 may rapidly increase in the first connection electrode 124c. However, a connection portion, in which the two adjacent first electrode pieces 124a and 124b are connected to each other by using the first auxiliary connection electrode 124d, may have a double-layer structure. As a result, the resistance of the first barrier electrodes 124 may be prevented from increasing by the connection portion more than when only the first connection electrode 124c of a single-layer structure is used.

In addition, when the first auxiliary connection electrode 124d is formed of a metallic material, the first connection electrode 124c may be omitted. In this case, two adjacent first electrode pieces 124a and 124b are electrically connected to each other by the first auxiliary connection electrode 124d.

Figure 11:
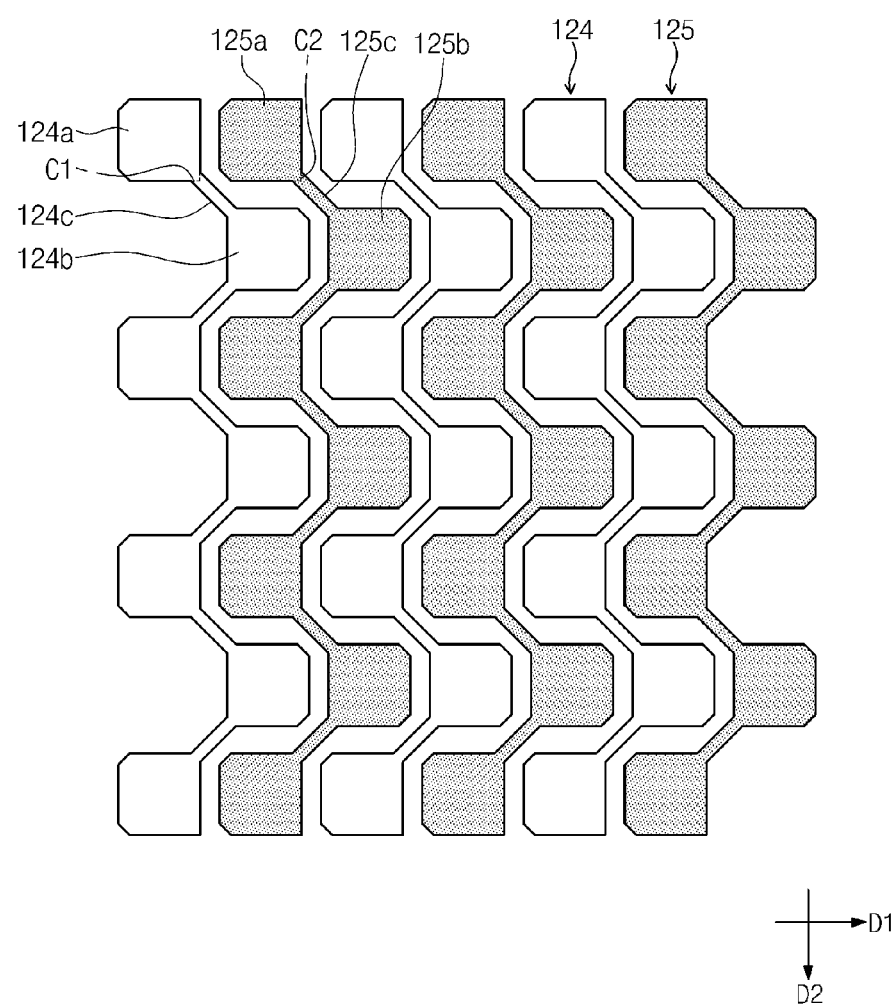
FIG. 11 is a plan view showing first and second barrier electrodes according to an exemplary embodiment of the present invention.

FIG. 11 is a plan view showing first and second barrier electrodes according to an exemplary embodiment of the present invention.

Referring to FIG. 11, the first connection electrode 124c is disposed between two adjacent first electrode pieces 124a and 124b and integrally formed with the two first electrode pieces 124a and 124b to connect two first corners C1 that are most adjacent to each other. The second connection electrode 125c is disposed between two adjacent second electrode pieces 125a and 125b and integrally formed with the two second electrode pieces 125a and 125b to connect two second corners C2 that are most adjacent to each other.

In addition, except the first corner C1, at least one corner of each first electrode piece 124a and 124b may be chamfered. Accordingly, a distance between the first barrier electrodes 124 and the second barrier electrodes 125 may be uniformly maintained without being narrowed in an area between the second connection electrode 125c and the corners of the first electrode pieces 124a and 124b.

Similarly, except the second corner C2, at least one corner of each second electrode piece 125a and 125b may be chamfered. Accordingly, the distance between the first barrier electrodes 124 and the second barrier electrodes 125 may be uniformly maintained without being narrowed in an area between the first connection electrode 124c and the corners of the second electrode pieces 125a and 125 b.

Figure 12:
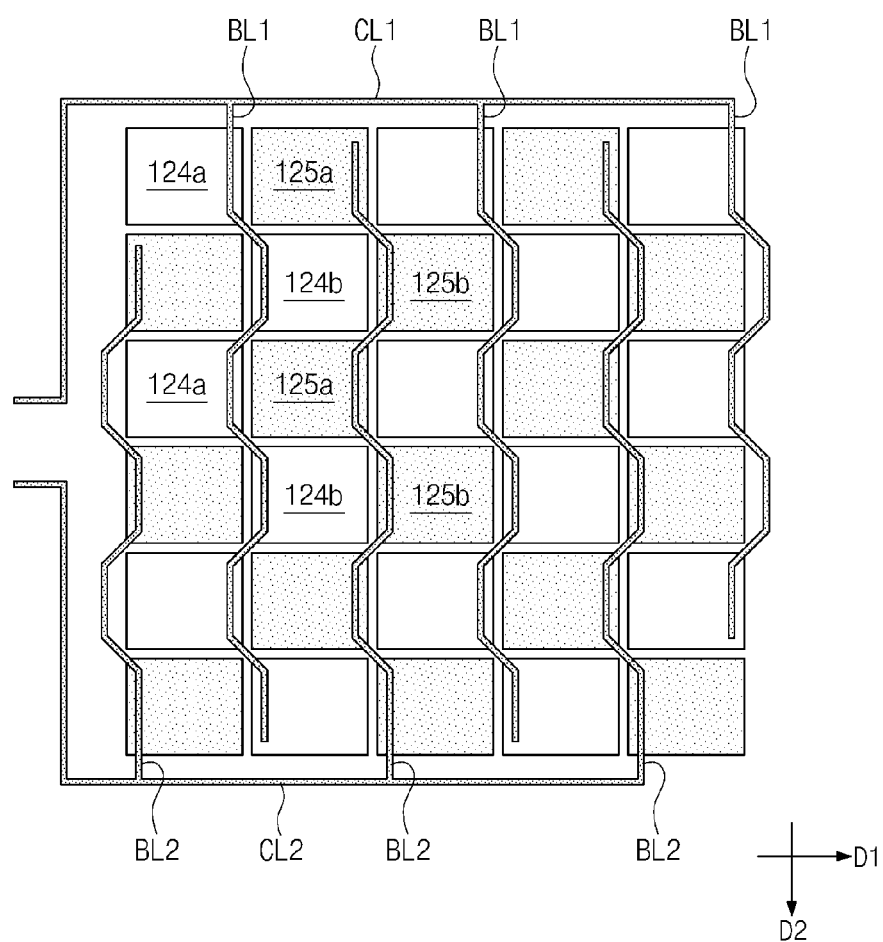
FIG. 12 is a plan view showing first and second barrier electrodes according to an exemplary embodiment of the present invention.

FIG. 12 is a plan view showing first and second barrier electrodes according to an exemplary embodiment of the present invention.

Referring to FIG. 12, the parallax barrier panel 120 further includes a first common line CL1 to electrically connect the first barrier electrodes 124 to each other and a second common line CL2 to electrically connect the second barrier electrodes 125 to each other.

In addition, the parallax barrier panel 120 includes a plurality of first branch lines BL1 branched from the first common line CL1 and extended in the second direction D2 and a plurality of second branch lines BL2 branched from the second common line CL2 and extended in the second direction D2.

Each first branch line BL1 is electrically connected to the first electrode pieces 124a and 124b of a first barrier electrode 124, and each second branch line BL2 is electrically connected to the second electrode pieces 125a and 125b of a second barrier electrode 125.

More specifically, each first branch line BL1 is overlapped with the first electrode piece 124a in an i-th column (i is an odd number equal to or larger 1) and overlapped with the first electrode piece 124b in an (i+1)-th column. Thus, each first branch line BL1 has a zigzag shape. In addition, each second branch line BL2 is overlapped with the second electrode piece 125a in the (i+1)-th column and overlapped with the second electrode piece 125b in an (i+2)-th column. Accordingly, each second branch line BL2 has a zigzag shape.

The first branch lines BL1 may be disposed substantially parallel to the second branch lines BL2 and alternately arranged with the second branch lines BL2 in the first direction D1.

In addition, the first and second electrode pieces 124a, 124b, 125a and 125b may be formed of a transparent conductive material, and the first and second common lines CL1 and CL2 and the first and second branch lines BL1 and BL2 may be formed of a conductive material, such as a metallic material. The conductive material may range from transparent to opaque. Furthermore, the first and second common lines CL1 and CL2 and the first and second branch lines BL1 and BL2 may replace the connection electrodes and auxiliary connection electrodes discussed above, as shown in FIG. 12, or alternatively, the first and second common lines CL1 and CL2 and the first and second branch lines BL1 and BL2 may be included with any one or both of the connection electrodes and auxiliary connection electrodes.

Although FIG. 12 shows the first and second branch lines BL1 and BL2 disposed on the first and second electrode pieces 124a, 124b, 125a and 125b, the first and second branch lines BL1 and BL2 may alternatively be disposed under the first and second electrode pieces 124a, 124b, 125a and 125b.

Figure 13:
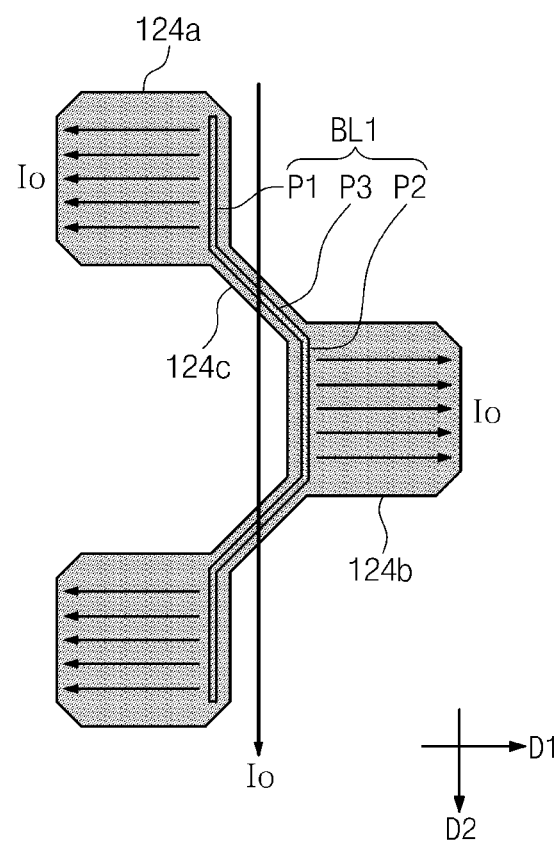
FIG. 13 is a plan view showing a first barrier electrode according to an exemplary embodiment of the present invention.

FIG. 13 is a plan view showing a first barrier electrode according to an exemplary embodiment of the present invention.

Referring to FIG. 13, the first barrier electrodes 124 include a plurality of first electrode pieces 124a and 124b and a first connection electrode 124c. The first connection electrode 124c electrically connects two first electrode pieces 124a and 124b to each other.

The first branch line BL1 includes a first portion P1 overlapped with a right side portion of the first electrode piece 124a in a first column, a second portion P2 overlapped with a left side portion of the first electrode piece 124b in a second column, and a third portion P3 overlapped with the first connection electrode 124c. The first portion P1 and the second portion P2 are electrically connected to each other by the third portion P3. The first portion P1 and the second portion P2 are substantially parallel to each other, and the third portion P3 extends in a direction substantially parallel to a direction in which the first connection electrode 124c extends.

When a first driving voltage is applied through the first branch line BL1, a current Io flows in the second direction D2. In addition, in case of the first electrode piece 124a in the first column, the current Io flows from the right side portion of the first electrode piece 124a to the left side portion of the first electrode piece 124a. In case of the first electrode piece 124b in the second column, the current Io flows from the left side portion of the first electrode piece 124b to the right side portion of the first electrode piece 124b. Therefore, the first driving voltage may be uniformly applied over the first electrode pieces 124a and 124b.

In addition, since the first branch line BL1 includes a metallic material having a resistance lower than that of the first barrier electrodes 124, deterioration in a charging speed of the first barrier electrodes 124, which may be caused by resistance-capacitance (RC) delay, may be prevented.

Figure 14:
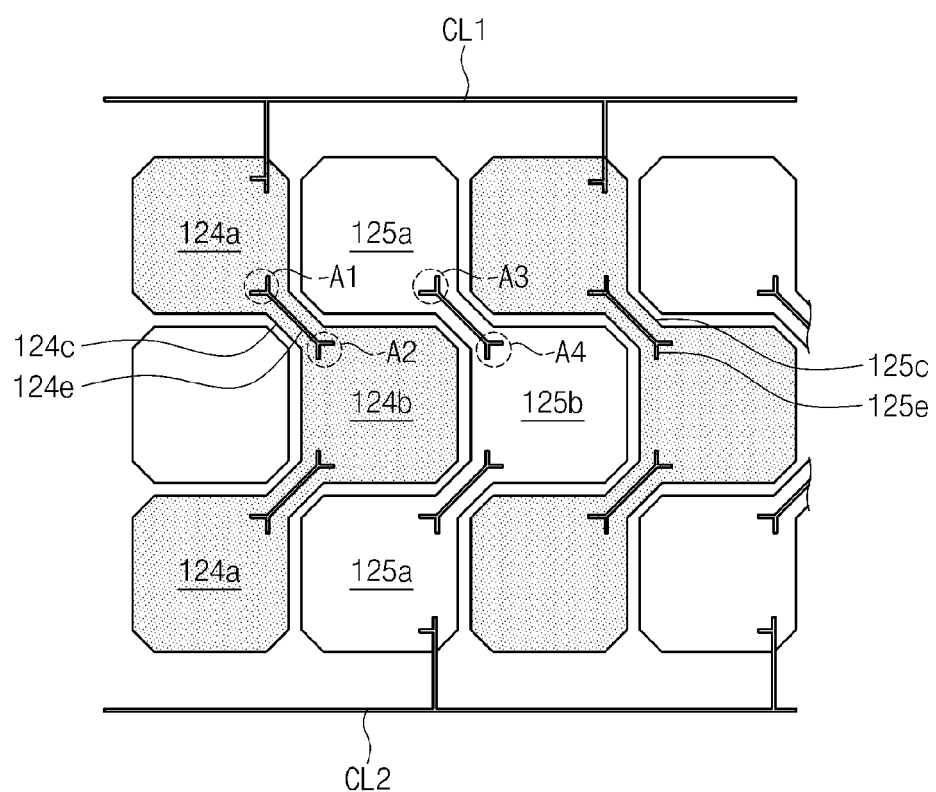
FIG. 14 is a plan view showing first and second barrier electrodes according to an exemplary embodiment of the present invention.

FIG. 14 is a plan view showing first and second barrier electrodes according to an exemplary embodiment of the present invention.

Referring to FIG. 14, the parallax barrier panel 120 further includes a first common line CL1 to electrically connect the first barrier electrodes 124 to each other and a second common line CL2 to electrically connect the second barrier electrodes 125 to each other.

The first common line CL1 is electrically connected to a first electrode piece 124a positioned at a first row, and the second common line CL2 is electrically connected to a second electrode piece 125a positioned at a last row.

The parallax barrier panel 120 further includes a first auxiliary connection electrode 124e disposed on or under a first connection electrode 124c of each of the first barrier electrodes 124 to make contact with the first connection electrode 124c and a second auxiliary connection electrode 125e disposed on or under a second connection electrode 125c of each of the second barrier electrodes 125 to make contact with the second connection electrode 125c. The first and second common lines CL1 and CL2 and the first and second auxiliary connection electrodes 124e and 125e may be formed of a conductive material, such as a metallic material. The metallic material may range from transparent to opaque.

The first auxiliary connection electrode 124e includes first and second extension patterns A1 and A2 extended from both ends thereof to two first electrode pieces 124a and 124b adjacent to each other, respectively. The first and second extension patterns A1 and A2 may each have an L-shape. In addition, the second auxiliary connection electrode 125e includes third and fourth extension patterns A3 and A4 extended from both ends thereof to two second electrode pieces 125a and 125b adjacent to each other, respectively. The third and fourth extension patterns A3 and A4 may each have an L-shape.

Since the first auxiliary connection electrode 124e includes the first and second extension patterns A1 and A2, a contact area between the first auxiliary connection electrode 124e and the first barrier electrodes 124 may increase. Accordingly, a line resistance of the first barrier electrodes 124 may be reduced, thereby improving the charging speed of the first barrier electrodes 124.

Similarly, since the second auxiliary connection electrode 125e includes the third and fourth extension patterns A3 and A4, a contact area between the second auxiliary connection electrode 125e and the second barrier electrodes 125 may increase. Thus, a line resistance of the second barrier electrodes 125 may be reduced and, thereby, improve the charging speed of the second barrier electrodes 125.

According to the above, the first barrier electrodes are alternately arranged with the second barrier electrodes in row and column directions to form a barrier area in a mosaic shape. Thus, the parallax barrier panel may be operated in the same manner regardless of a watching mode thereof. As a result, an additional process required to control the operation of the parallax barrier panel according to the watching mode is unnecessary.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalent.

What is claimed is:

1. A three dimensional (3D) image display, comprising:
   a display panel configured to display a first image in a 2D driving mode and to display a second image and a third image during respective first and second periods alternately generated in a 3D driving mode, the display panel including pixels arranged in a matrix form comprising rows and columns; and
   a barrier panel configured to transmit the first image during the 2D driving mode, to form a first barrier pattern during the first period to separate the second image into left and right-eye images, and to form a second barrier pattern during the second period to separate the third image into the left and right-eye images, the barrier panel comprising:
      a reference electrode;
      first barrier electrodes facing the reference electrode and arranged in a first direction, each first barrier electrode comprising:
         first electrode pieces arranged in a zigzag fashion along a second direction different from the first direction;
      second barrier electrodes facing the reference electrode and being alternately arranged with the first barrier electrodes in the first direction, each second barrier electrode comprising:
         second electrode pieces arranged in the zigzag fashion along the second direction;
      a liquid crystal layer interposed between the reference electrode and the first barrier electrodes and between the reference electrode and the second barrier electrodes;
      wherein a second electrode piece of the second barrier electrodes corresponds to an i th column and j th row of the matrix form and is interposed between two first electrode pieces of a first barrier electrode, and
      wherein the two first electrode pieces correspond to the i th column and j−1 th row of the matrix form and the i th column and j+1 th row of the matrix form, respectively, where i, j, and j−1 are natural numbers.

2. The 3D image display of claim 1, wherein the first electrode pieces are alternately arranged with the second electrode pieces in the first direction and the second direction.

3. The 3D image display of claim 1, wherein the reference electrode is configured to receive the reference voltage during the first and second periods in the 3D driving mode, the first barrier electrodes are configured to receive the first driving voltage having the same level as the reference voltage during the first period, and the second barrier electrodes are configured to receive the second driving voltage, the second voltage having a different level from the reference voltage during the first period to form a first barrier pattern.

4. The 3D image display of claim 3, wherein the first barrier electrodes are configured to receive the second driving voltage during the second period and the second barrier electrodes are configured to receive the first driving voltage during the second period to form a second barrier pattern.

5. The 3D image display of claim 1, wherein the display panel comprises pixels, each pixel comprising three sub-pixels arranged in the first direction, and each of the first and second electrode pieces has a size corresponding to one of the pixels and is disposed corresponding to one of the pixels.

6. The 3D image display of claim 5, wherein each of the first and second electrode pieces has a square shape with the same length in the first and second directions.

7. The 3D image display of claim 1, wherein each of the first barrier electrodes comprises a first connection electrode to electrically connect first electrode pieces to each other, and each of the second barrier electrodes comprises a second connection electrode to electrically connect second electrode pieces to each other.

8. The 3D image display of claim 1, wherein:
   the first connection electrodes are each disposed between two adjacent first electrode pieces and integrally formed with the two adjacent first electrode pieces to connect two first corners that are most adjacent to each other; and
   the second connection electrodes are each disposed between two adjacent second electrode pieces and integrally formed with the two adjacent second electrode pieces to connect two second corners that are most adjacent to each other.

9. The 3D image display of claim 8, wherein, except the first corner, at least one corner of each of the first electrode pieces is chamfered, and, except the second corner, at least one corner of each of the second electrode pieces is chamfered.

10. The 3D image display of claim 8, wherein each of the first barrier electrodes further comprises a first auxiliary connection electrode connected to the first connection electrode and comprising a material having a line resistance smaller than a line resistance of the first connection electrode, and each of the second barrier electrodes further comprises a second auxiliary connection electrode connected to the second connection electrode and comprising a material having a line resistance smaller than a line resistance of the second connection electrode.

11. The 3D image display of claim 10, wherein the first and second connection electrodes each comprise a transparent conductive material, and the first and second auxiliary connection electrodes each comprise a metallic material.

12. The 3D image display of claim 7, wherein the barrier panel further comprises:
   a first common line that electrically connects the first barrier electrodes to each other; and
   a second common line that electrically connects the second barrier electrodes to each other.

13. The 3D image display of claim 12, wherein the barrier panel further comprises:
- a plurality of first branch lines branched from the first common line and extended in the second direction, each of the first branch lines contacting the first electrode pieces of a corresponding first barrier electrode; and
- a plurality of second branch lines branched from the second common line and extended in the second direction, each of the second branch lines contacting the second electrode pieces of a corresponding second barrier electrode.

14. The 3D image display of claim 13, wherein the first and second connection electrodes each comprise a transparent conductive material, and the first and second common lines and the first and second branch lines each comprise a metallic material.

15. The 3D image display of claim 12, wherein each of the first barrier electrodes further comprises a first auxiliary connection electrode connected to the first connection electrode and comprising a material having a line resistance smaller than a line resistance of the first connection electrode, and each of the second barrier electrodes further comprises a second auxiliary connection electrode connected to the second connection electrode and comprising a material having a line resistance smaller than a line resistance of the second connection electrode.

16. The 3D image display of claim 15, wherein the first and second connection electrodes each comprise a transparent conductive material, and the first and second common lines and the first and second auxiliary connection electrodes each comprise a metal material.

17. The 3D image display of claim 1, wherein the barrier panel further comprises:
- a first common line that electrically connects the first barrier electrodes to each other; and
- a second common line that electrically connects the second barrier electrodes to each other.

18. The 3D image display of claim 17, wherein the barrier panel further comprises:
- first branch lines branched from the first common line and extended in the second direction, each of the first branch lines contacting the first electrode pieces of a corresponding first barrier electrode; and
- second branch lines branched from the second common line and extended in the second direction, each of the second branch lines contacting with the second electrode pieces of a corresponding second barrier electrode.

19. The 3D image display of claim 18, wherein the first and second connection electrodes each comprise a transparent conductive material, and the first and second common lines and the first and second branch lines each comprise a metallic material.

20. The 3D image display of claim 18, wherein each of the first electrode pieces comprises at least one chamfered corner, and each of the second electrode pieces comprises at least one chamfered corner.

21. A barrier panel configured to transmit a two dimensional (2D) image in a 2D image display mode, and to transmit a three dimensional (3D) image in a 3D image display mode by forming a first barrier pattern during a first period to provide left and right-eye images and by forming a second barrier pattern during a second period different from the first period to provide left and right-eye images, the barrier panel comprising:
- a first substrate comprising a reference electrode;
- a second substrate opposing the first substrate;
- first barrier electrodes disposed on the second substrate, facing the reference electrode, and extending in a first direction, the first barrier electrodes each comprising:
  - first electrode pieces arranged in a zigzag fashion along a second direction different from the first direction;
- second barrier electrodes disposed on the second substrate, facing the reference electrode, and alternately arranged with the first barrier electrodes in the first direction, the second barrier electrodes each comprising:
  - second electrode pieces arranged in the zigzag fashion along the second direction;
- a liquid crystal layer disposed between the first substrate and the second substrate; and
  - wherein a length of the first electrode pieces, respectively, in the first direction is substantially equal to a length of the first electrode pieces, respectively, in the second direction and wherein a length of the second electrode pieces, respectively, in the first direction is substantially equal to a length of the second electrode pieces, respectively, in the second direction,
  - wherein each of the first barrier electrodes comprises a first connection electrode to electrically connect first electrode pieces to each other, and each of the second barrier electrodes comprises a second connection electrode to electrically connect second electrode pieces to each other,
  - wherein the first connection electrode is disposed between two adjacent first electrode pieces and integrally formed with the two adjacent first electrode pieces to connect two first corners that are most adjacent to each other, and the second connection electrode is disposed between two adjacent second electrode pieces and integrally formed with the two adjacent second electrode pieces to connect two second corners that are most adjacent to each other, and
  - wherein each of the first barrier electrodes further comprises a first auxiliary connection electrode connected to the first connection electrode and comprising a material having a line resistance smaller than a line resistance of the first connection electrode, and each of the second barrier electrodes further comprises a second auxiliary connection electrode connected to the second connection electrode and comprising a material having a line resistance smaller than a line resistance of the second connection electrode.

22. The barrier panel of claim 21, wherein, except the first corner, at least one corner of each of the first electrode pieces is chamfered, and, except the second corner, at least one corner of each of the second electrode pieces is chamfered.

23. The barrier panel of claim 21, wherein the first and second connection electrodes each comprise a transparent conductive material, and the first and second auxiliary connection electrodes each comprise a metallic material.

24. The barrier panel of claim 21, wherein the barrier panel further comprises:
- a first common line that electrically connects the first barrier electrodes to each other; and
- a second common line that electrically connects the second barrier electrodes to each other.

25. The barrier panel of claim 24, wherein the barrier panel further comprises:
- a plurality of first branch lines branched from the first common line and extended in the second direction, each of the first branch lines contacting the first electrode pieces of a corresponding first barrier electrode; and
- a plurality of second branch lines branched from the second common line and extended in the second direction, each of the second branch lines contacting the second electrode pieces of a corresponding second barrier electrode.

26. A three dimensional (3D) image display, comprising:
a display panel configured to display a first image in a 2D driving mode and to display a second image and a third image during respective first and second periods alternately generated in a 3D driving mode, the display panel having a plurality of pixels disposed in a matrix having a plurality of rows and columns along a first direction and a second direction different from the first direction; and
a barrier panel configured to transmit the first image during the 2D driving mode, to form a first barrier pattern during the first period to separate the second image into left and right-eye images, and to form a second barrier pattern during the second period to separate the third image into the left and right-eye images, the barrier panel comprising:
a reference electrode;
first barrier electrodes facing the reference electrode and arranged in the first direction parallel with a direction in which the rows are defined, each first barrier electrode comprising:
first electrode pieces arranged in a zigzag fashion along the second direction parallel with a direction in which the columns are defined;
second barrier electrodes facing the reference electrode and being alternately arranged with the first barrier electrodes in the first direction, each second barrier electrode comprising:
second electrode pieces arranged in the zigzag fashion along the second direction;
a liquid crystal layer interposed between the reference electrode and the first barrier electrodes and between the reference electrode and the second barrier electrodes, and
wherein, the first and second electrode pieces are positioned in accordance with the rows and columns of the matrix and alternately arranged by a unit of the row and the column of the matrix,
wherein, the first electrode pieces positioned at an i th column of the matrix, among the first electrode pieces, are positioned at even-numbered rows of the matrix, and the second electrode pieces positioned at the i th column of the matrix, among the second electrode pieces, are positioned at odd-numbered rows of the matrix,
wherein the first electrode pieces positioned at i+1 th column of the matrix, among the first electrode pieces, are positioned at the odd-numbered rows of the matrix, and the second electrode pieces positioned at the i+1 th column of the matrix, among the second electrode pieces, are positioned at the even-numbered rows of the matrix, where i and i−1 are consecutive natural numbers, and
wherein the first and second electrode pieces have a shape substantially corresponding to a square.

27. The 3D image display of claim 26, wherein the first electrode piece positioned at the i th column and a j th row and the first electrode piece positioned at the i+1 th column and a j+1 th row are connected through a connection electrode, the connection electrode displaying a relatively insignificant barrier pattern to a human eye in comparison with the first electrode pieces, where i and j+1 are consecutive natural numbers.

28. The 3D image display of claim 26, wherein the second electrode piece positioned at the i+1 th column and a j th row and the second electrode piece positioned at the i th column and a j+1 th row are connected through a connection electrode, the connection electrode displaying a relatively insignificant barrier pattern to a human eye in comparison with the second electrode pieces, where i and j+1 are consecutive natural numbers.

* * * * *